United States Patent [19]
Racky et al.

[11] 3,883,475
[45] May 13, 1975

[54] MOULDING COMPOSITION OF THERMOPLASTIC MATERIALS

[75] Inventors: Werner Racky, Wiesbaden; Harald Cherdron, Naurod, Taunus, both of Germany

[73] Assignee: Hoechst Aktiengesellschaft, Frankfurt am Main, Germany

[22] Filed: Feb. 15, 1974

[21] Appl. No.: 442,829

[30] Foreign Application Priority Data
Feb. 19, 1973 Germany............................ 2308104

[52] U.S. Cl................. 260/45.7 P; 260/45.75 D; 260/45.75 E
[51] Int. Cl. ...................... C08f 45/56; C08g 51/56

[58] Field of Search................................. 260/45.7 P

[56] References Cited
UNITED STATES PATENTS

| | | | |
|---|---|---|---|
| 3,477,982 | 11/1969 | Dijkstra et al.............. | 260/45.7 P X |
| 3,546,160 | 12/1970 | Dany et al...................... | 260/45.7 P |
| 3,806,488 | 4/1974 | Stone et al. ................ | 260/45.7 P X |

*Primary Examiner*—Lewis T. Jacobs
*Attorney, Agent, or Firm*—Curtis, Morris & Safford

[57] ABSTRACT

Flame proof thermoplastic moulding composition which contains red phosphorus and a substance binding hydrogen phosphide.

4 Claims, No Drawings

MOULDING COMPOSITION OF THERMOPLASTIC MATERIALS

The present invention relates to a moulding composition of thermoplastic materials.

It is known that red phosphorus is very suitable for fire-proofing a number of polymers. Thus, in German Patent Specification No. 1,173,641, in German Auslegeschrift No. 1,965,635, in U.S. Pat. No. 3,373,135, in British Patent Specification 1,157,419, in British Patent Specification 1,147,009 and in German Offenlegungsschrift No. 2,133,557 the addition of red phosphorus to polyurethanes, polyamides, polyformaldehyde, polyethylene terephthalate epoxy resins, styrene-/acrylo-nitrile-copolymers, polyvinyl chloride and polyolefins is described.

In the handling of red phosphorus special precautions are desirably taken, in order to avoid a formation of phosphorus dust, which can cause explosions. Of still greater importance is the formation of hydrogen phosphide which is strongly favoured by atmospheric humidity and which can nearly always be detected with the use of red phosphorus. Hydrogen phosphide is a highly toxic gas the maximum working concentration of which is given in the literature as 0.1 ppm. It can be detected easily by its characteristic odour, the odour limit being approximately at 0.02 ppm. Since, however, 400 ppm of this gas are dangerous to life the use of the red phosphorus as fire retarding agent is called into question. This problem is especially critical if a polymer made flame proof by red phosphorus is maintained or shipped in closed containers since then hydrogen phosphide concentrates and the maximum working concentration may be considerably exceeded.

It has now been found that this disadvantage is overcome when the moulding composition of thermoplastic materials contains phosphorus and a substance binding hydrogen phosphide.

As the substance binding hydrogen phosphide the compounds of the group $MoS_2$, $HgO$, $PbO_2$, $AgNO_3$, $HgCl_2$, $FeCl_3 \cdot 6 H_2O$, $CuO$ and active carbon have proved suitable. The best results are obtained with copper - (II) - oxide and active carbon.

These substances binding hydrogen phosphide are used generally in concentrations of from 0.2 to 15 percent by weight, preferably 1 to 10 percent by weight, calculated on the quantity of the red phosphorus. The red phosphorus is in general present in quantities of from 1 to 20 percent by weight, preferably 2 to 10 percent by weight, calculated on the total weight of the moulding composition.

With the use of active carbon as substance binding hydrogen phosphide the most favourable results are obtained when the active carbon has a specific surface of from 900 to 1300 $m^2/g$, preferably 1000 to 1100 $m^2/g$.

A special advantage of the aforesaid substances binding hydrogen phosphide is that they have the required effect even when used in the small quantities disclosed. Other properties of the thermoplastic materials containing phosphorus are practically unchanged.

The disclosed additives are advantageously used with polyurethanes, polyamides, polyformaldehyde, polyethylene terephthalate, epoxy resins, styrene/acrylonitrile copolymers, polyvinyl chloride, polyethylene and polypropylene.

The moulding compositions of thermoplastic materials prepared according to the invention no longer smell of hydrogen phosphide. Thereby, the safe use of the red phosphorus as fire-retarding agent is guaranteed without the undesired accompanying phenomenon of the development of highly toxic hydrogen phosphides. At the same time with the use of active carbon or copper - (II) - oxide the red natural colour of the phosphorus is covered and a black coloured moulding composition desired for many purposes is obtained. Furthermore, active carbon is distinguished by its physiological compatibility.

It is remarkable that many other compounds with active surface such as aluminium oxide, silica, or molecular sieves are not suitable, or only suitable in much higher concentrations, for the binding of the hydrogen phosphide in moulding compositions of thermoplastic materials.

For the preparation of the moulding compositions of the invention it is recommended to mix the red phosphorus and the substance binding hydrogen phosphide and to apply this mixture, optionally with the aid of an adhesion promoter to a polymer granulate, or to blend the mixture of phosphorus and substance binding hydrogen phosphide with a powdery polymer. As adhesion promoters certain phosphoric acid esters as described in detail in German Offenlegungsschrift No. 2,237,875 have proved especially good.

In the following examples a moulding composition of linear saturated polyethylene terephthalate is blended with red phosphorus and various substances binding hydrogen phosphide. In no case was the characteristic hydrogen phosphide odour detected. Corresponding results could also be obtained with the other thermoplastic materials named in the description.

The following examples illustrate the invention.

EXAMPLES 3 g of red phosphorus and the compounds given in the following table were weighed and put into an Erlenmeyer-flask of 100 ml provided with a stopper. After repeated stirring and leaving to stand for 12 hours at room temperature the hydrogen phosphide concentration was determined analytically. The values given in the table were measured. Polyethylene terephthalate granules were subsequently coated or blended with the respective mixtures. In no case was a hydrogen phosphide odour detected.

TABLE

| Example Number | Addition to 3 g of red phosphorus on red | in % calculated phosphorus | Concentrations of $PH_3$ in the Erlen-Meyer in ppm |
|---|---|---|---|
|  | (comparative experiment) | — | 35 – 40 |
| 1 | HgO | 2 | 1 |
| 2 | $MoS_2$ | 2 | 1 |
| 3 | $PbO_2$ | 2 | 1 |
| 4 | active carbon | 7 | — |
| 5 | CuO | 10 | — |
| 6 | $FeCl_3 \cdot 6 H_2O$ | 10 | 1 |
| 7 | $HgCl_2$ | 1 | — |
| 8 | $AgNO_3$ | 1 | — |

We claim:

1. A moulding composition of thermoplastic material containing from 1 to 20 percent by weight, based on the total weight of moulding composition, of red phosphorus and from 0.2 to 15 percent by weight, based on the weight of red phosphorus, of a substance binding hydrogen phosphide selected from the group consisting of $MoS_2$, $HgO$, $PbO_2$, $AgNO_3$, $HgCl_2$, $FeCl_3 \cdot 6 H_2O$, $CuO$, and active carbon.

2. Moulding composition of thermoplastic material as claimed in claim 1, wherein the thermoplastic material is a polyurethane, a polyamide, a polyformaldehyde, polyethlene terephthalate, an epoxy resin, a styreneacrylonitrile copolymer, polyvinyl chloride, polyethylene, or polypropylene.

3. Moulding composition of thermoplastic material as claimed in claim 1, wherein the red phosphorus and the substance binding hydrogen phosphide, optionally with the aid of an adhesion promoter, are applied to the surface of the thermoplastic material.

4. Moulding composition of thermoplastic material as claimed in claim 1, wherein the active carbon used as substance for binding hydrogen phosphide has a specific surface of from 900 to 1300 $m^2/g$.

* * * * *